Nov. 14, 1944.  N. D. LEVIN  2,362,647
CLUTCH DEVICE
Original Filed Oct. 22, 1937  2 Sheets-Sheet 1
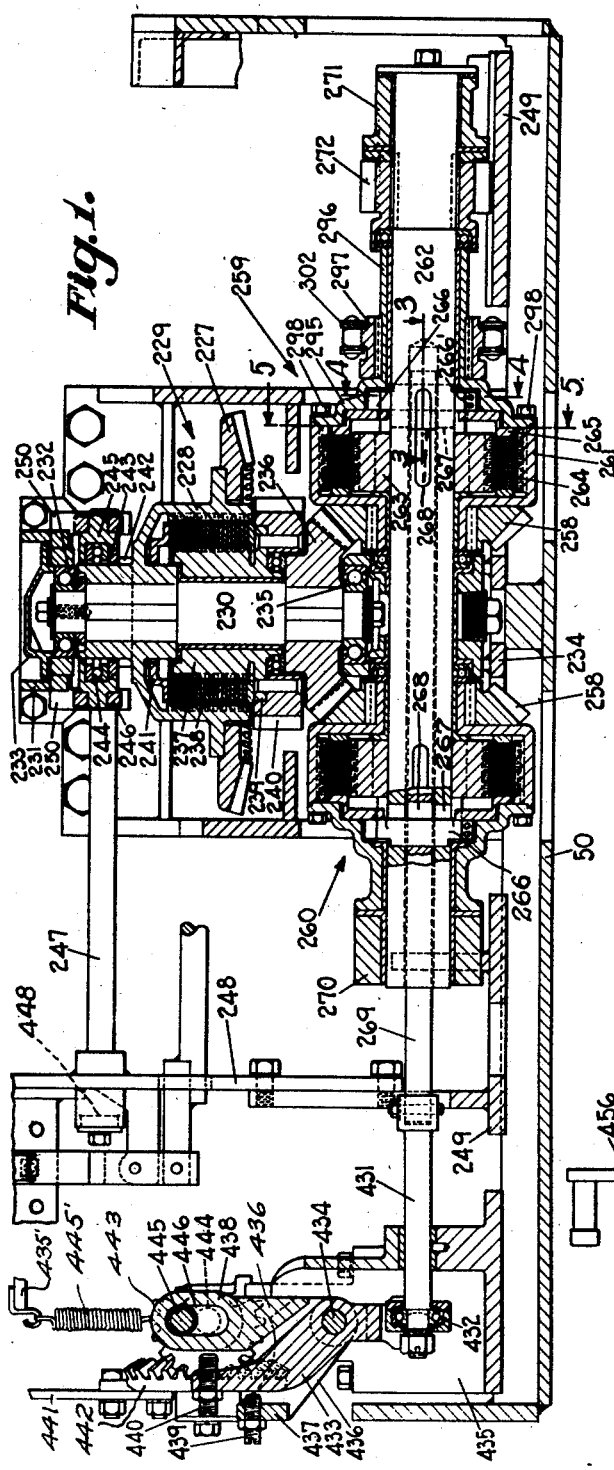
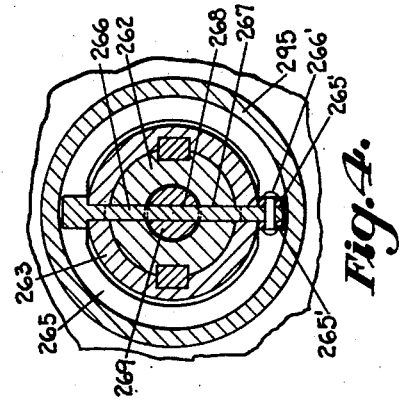
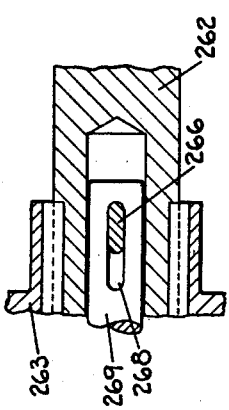
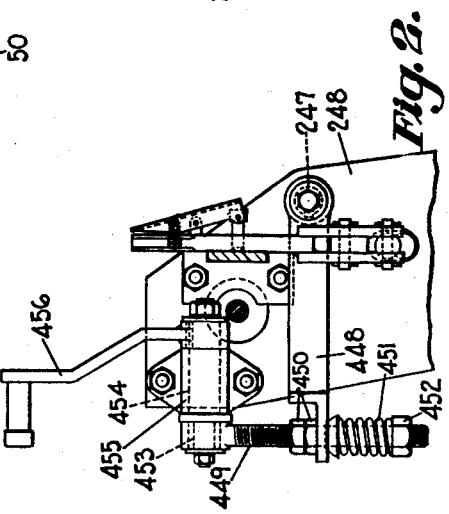
INVENTOR:
NILS D. LEVIN,
By Chas. M. Nissen,
ATTY.

Nov. 14, 1944.  N. D. LEVIN  2,362,647
CLUTCH DEVICE
Original Filed Oct. 22, 1937  2 Sheets-Sheet 2

INVENTOR:
NILS D. LEVIN,
BY Chas. M. Nissen,
ATT'Y.

Patented Nov. 14, 1944

2,362,647

UNITED STATES PATENT OFFICE 2,362,647

CLUTCH DEVICE

Nils D. Levin, Columbus, Ohio, assignor to The Jeffrey Manufacturing Company, a corporation of Ohio Original application October 22, 1937, Serial No. 170,426. Divided and this application February 4, 1941, Serial No. 377,349

23 Claims. (Cl. 192—51)

This invention relates to loading machines particularly adapted for loading coal in a coal mine, and one of its objects is the provision of improved power-transmission mechanism for operating traveling conveyor means embodied in the machine.

Another object of the invention is the provision of clutch controlled reversible power-transmission mechanism for propelling means of the loading machine.

Still another object of the invention is to provide in a loading machine improved and efficient power-transmission mechanism for various operations from a single motor on the main frame of the machine.

A further object of the invention is to provide a novel controlling means for a plurality of friction clutches, particularly useful in connection with loading machines.

More particularly it is the object of the present invention to provide friction clutch controlled reversible power-transmission means for loading machine propelling means.

Other objects of the invention will appear hereinafter, the novel features and combinations being set forth in the appended claims.

In the accompanying drawings,

Fig. 1 is a transverse sectional view of the power transmission mechanism embodying my improvements;

Fig. 2 is an enlarged detail view showing the operating mechanism for applying the main or starting clutch;

Fig. 3 is an enlarged sectional view taken on the line 3—3 of Fig. 1, looking in the direction of the arrows;

Fig. 4 is an enlarged sectional view taken on the line 4—4 of Fig. 1 looking in the direction of the arrows.

Figure 6:
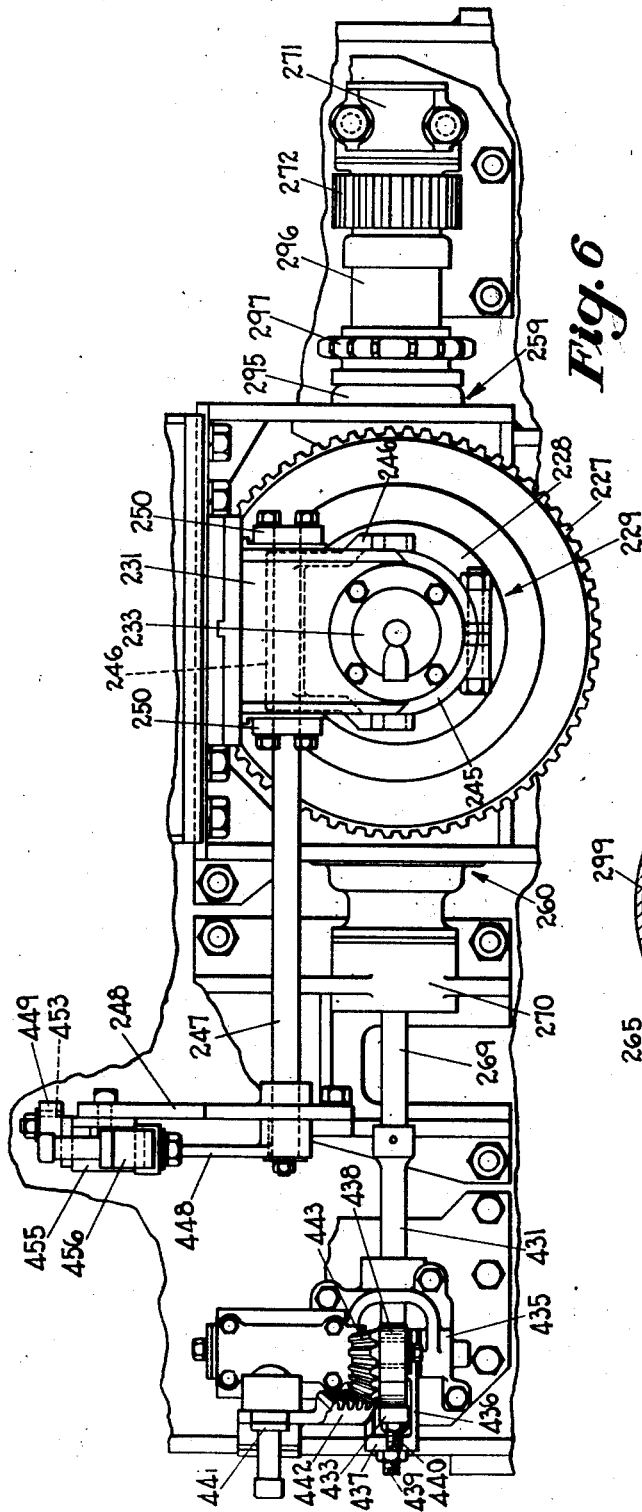
Fig. 6 is a plan view of the construction shown in Fig. 1 including the mechanism for manually operating the clutches.

This application is a division of my co-pending application, Serial No. 170,426, filed October 22, 1937, for an improvement in a loading machine.

Attention is now directed to the power transmission mechanism connected to the various devices to operate the same. At the outset it may be stated that only a single or common electric operating motor is relied upon as the primary source of power to effect a driving of all the devices of a loading machine.

The electric operating motor is provided with a forwardly extending armature shaft carrying a beveled drive pinion meshing with a beveled ring gear 227 which is rigidly attached to the housing 228 of a friction clutch 229. The housing 228 is keyed to a vertical shaft 230 which is mounted at its top in a bracket 231 rigidly attached to the main frame of the truck 40. An anti-friction ball bearing 232 is interposed between the bracket 231 and the shaft 230, which is held in place by a removable cap 233.

The bottom of the shaft 230 is supported in a bracket 234 (Fig. 1) formed rigid with the bottom plate 50, said support being through an anti-friction ball bearing 235. Keyed to the lower end of the shaft 230 and above the ball bearing 235, is a bevel gear 236. It should be noted that the gear 227 and the gear 236 are both keyed to the shaft 230, and both will therefore be driven together at all times from the motor.

Journaled loosely on the central portion of the shaft 230 is a clutch member 237. Splined on the interior of the housing 228 and on the exterior of the clutch member 237, which members 228 and 237 comprise co-operating clutch members, is a plurality of overlapping stacked friction plates 238, alternate ones of which are connected to the housing 228 and the clutch member 237, respectively. Adjacent its bottom the clutch member 237 is provided with an integral extended flange 239 to which is secured a gear 240. The flange 239, in addition to supporting the gear 240, also acts as one compression member for the friction clutch plates 238.

To effect the compression of the clutch plates 238 (Fig. 1) and thus to effect engagement of the clutch members 228 and 237, I provide a compression ring 241 within the housing 228. The circular flange of the ring 241 bears against the plates 238. Downward movement of the ring 241 to effect the aforementioned compression action is effected by a plurality of pins 242 which extend through apertures in the housing 228 and are carried by a ring 243 operable through an anti-friction ball bearing 244 operable by a trunnion collar 245 which is controlled by a shipper 246 keyed on a shaft 247, which shaft 247 is journaled at one in an upwardly extending plate 248 rigidly attached to a false bottom plate 249 which, in turn, is rigidly attached to the main frame of the truck of the loading machine.

Adjacent its other end the shaft 247 is supported in a pair of downwardly extending apertured plates 250, 250 which are bolted to the brackets 231.

Rocking movement of the shaft 247 to urge the collar 245 downward, will cause an application of the friction clutch 229 to drive the gear 240. When the shaft 247 is released the clutch 229 will automatically become disengaged due to lack of sufficient clamping pressure on the plates 238. The operating means for rotating the shaft 247 is shown in Figs. 1 and 2. The gear train or power transmission mechanism for the truck propelling means, includes the previously described gear 236 which is driven directly from the operating motor. The gear 236 is beveled and meshes on opposite sides with bevel gears 258, 258 of reversing friction clutches 259 and 260, respectively, as shown in Fig. 1.

Except in respects hereinafter described in full detail, the clutches 259 and 260 are similar and therefore a detailed description of clutch 259 will suffice for both. The clutch 259 comprises a housing 261 to which the bevel gear 258 is keyed. The housing 261 is loosely journaled on a longitudinally extending hollow drive shaft 262 to which is keyed a clutch member 263. Housing 261 and clutch member 263 carry alternate stacked friction clutch plates 264 which may be compressed into clutch engaging position by an operating ring 265 adapted to be engaged by the opposed heads of an operating key 266 (Fig. 4) which extends through an elongated slot 267 in the drive shaft 262 and through an elongated slot 268 (Fig. 3) in an operating shaft 269 and is removably held in place by said end heads, one of which is formed by spaced bars 265' rigidly and removably attached by rivets 266'.

By referring to Fig. 1 it will be seen that the bevel gears 258 are rotated by the bevel gear 236 in reverse directions. Consequently, when the clutch 259 is applied, the shaft 262 will be rotated in one direction by the motor 224, and when the clutch 260 is applied, the shaft 262 will be rotated in the reverse direction.

Figure 5:
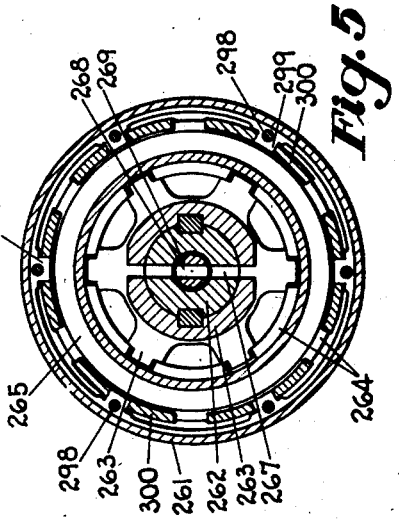
Fig. 5 is a sectional view taken on the line 5—5 of Fig. 1 looking in the direction of the arrows.

Elongated slots 268 are so spaced with respect to the operating shaft 269 that both of said clutches 259, 260 may be in disengaged or released position at the same time, and when the shaft 269 is shifted to the right, as viewed in Fig. 5, the clutch 260 will be applied and when shifted to the left the clutch 259 will be applied.

The opposite ends of the shaft 262 are mounted in appropriate journal bearings 270 and 271 both formed rigid with the false bottom plate 249.

Keyed to the shaft 262 is a drive pinion 272 adapted to be connected to the truck propelling mechanism of the loading machine.

Since the drive shaft 230 may always be driven in the same direction the truck propelling mechanism may be reversed by means of the reversing gearing shown in Fig. 1, without reversing the direction of rotation of the operating motor.

As clearly shown in Fig. 1, the housing 261 has rigidly attached to it a cover plate 295 having a neck 296 which is journaled loosely on the drive shaft 262. A drive sprocket 297 is keyed to the neck 296. The cover plate 295 is removably attached to the housing 261 by machine screws 298, but to prevent shearing stresses being carried by the screws 298, I provide interlocking bosses 299 and 300 which are carried by the housing 261 and the cover plate 295, respectively, as clearly illustrated in Fig. 5. It is therefore evident that rotation of the bevel gear 258 which is keyed to the housing 261, as shown in Fig. 1, will be transmitted directly to the sprocket 297 through the housing 261 and the cover plate 295; the bevel gear 258 being rigidly connected to the sprocket 297 by means of the housing 261, the cover plate 295 and the machine screws 298.

The drive sprocket 297 is adapted to drive the discharge conveyor of the loading machine by means comprising a chain 302.

Attention is now directed particularly to Fig. 1 illustrating the operating mechanism for controlling the reversing clutches 259 and 260 which may be operated to reverse the direction of rotation of the shaft 262 to which is keyed the pinion 272. It has been found in practice that clutches tend to become worn and I have therefore provided means to compensate for this wear on the clutches 259 and 260. Removably attached to the actuating shaft 269 for the clutches 259 and 260 is a removable extension shaft 431 which is connected by an anti-friction thrust bearing 432 to a bifurcated actuating lever 433 pivotally mounted on a pin 434 on a bracket 435 supported by the false bottom plate 249. As shown at the left-hand end of Fig. 1, the upper portion of the lever 433 extends through a central opening of an operating lever 436 which is also pivoted to the pin 434. The operating lever 436 comprises a pair of spaced side plates connected by a forward connecting strap 437 and a rear connecting lug 438 (Figs. 1 and 6). The connecting strap 437 carries an adjustable set screw 439 adapted to be adjusted to determine the effective contacting position between the pivoted lever 433 and the operating lever 436 when the latter is rocked in a clockwise direction, as viewed in Fig. 1.

The upper end of the actuating lever 433 is also provided with an adjustable set screw 440 which determines the position of effective contact between the actuating lever 433 and the operating lever 436 when the latter is rocked in a counter-clock-wise direction, as viewed in Fig. 1. In other words, the adjustable set screws 439 and 440 may be adjusted to predetermine the amount of lost motion between the operating lever 436 and the actuating lever 433. This lost motion will be reduced as the clutches 259 and 260 become worn, thereby maintaining the predetermined angle of throw of the lever 441 and the predetermined angle of arcuate movement of the crank pin 445.

The operating lever 436 has associated with it operating means which are constructed and arranged to move the lever 436 to either of two extreme positions and lock it in either of said positions. This operating means comprises an operating handle 441 secured to a segmental bevel gear 442 journaled on a shaft bearing carried by the bracket 435. The gear 442 meshes with a segmental bevel gear 443 journaled on a shaft 444 mounted in the bracket 435. The segmental pinion 443 carries a crank pin 445 which is spaced from the axis of the shaft 444. The crank pin 445 carries an anti-friction roller which rolls in an elongated slot 446 of the lug 438 of the operating lever 436.

Upon operating the handle 441 in one direction the segmental pinion 443 will be rotated in a clockwise direction, as viewed in Fig. 1, to effect swinging of the operating lever 436 in a clockwise direction to cause engagement between the set screw 439 and the actuating lever 433 which will cause the operating shaft 269 to be moved to the left as viewed in Fig. 1, to effect engagement or application of the clutch 259. Reverse movement of the handle 441 from its neutral position will cause engagement or application of the clutch 260 in a similar manner.

Movement of the handle 441 in either direction is limited by the roller on the crank pin 445 striking the extreme lower end of the slot 446. The slot 446 has such a length that the extreme lower end thereof is encountered slightly after the crank pin 445 has passed over alternate dead center positions which are slightly more than 90° spaced from the position illustrated in Fig. 1. In these dead center positions or when slightly beyond them, the operating lever 441 will be held in clutch engaging position until returned by an operator taking hold of the operating handle 441 and forcing it back to neutral position. The throw of the operating lever 436 in one direction or the other from its neutral position shown in Fig. 1 will therefore always remain substantially the same but the extent of throw of the actuating lever 433 must be varied to compensate for the wear in the clutches 259 and 260.

When the clutches are first installed the lost motion between the operating lever 436 and the actuating lever 433 is at a maximum because the necessary throw of the lever 433 in either direction is at a minimum. As the clutches wear, however, the throw of the lever 433 must be increased and this is effected by decreasing the amount of lost motion between the levers 436 and 433. In other words, the lost motion is gradually taken up by adjustment of the set screws 439 and 440 so that with a predetermined throw of the operating lever 436, increased throw of the actuating lever 433 may be obtained as the clutches 259 and 260 become worn.

It should also be noted that when the handle 441 is in its upright or neutral position, as shown in Fig. 1, both of the clutches 259 and 260 will be released or disengaged and consequently the drive shaft 262 will remain stationary. The operating handle 441 may be biased to this upright or neutral position by means of a coil spring 445', one end of which is attached to the crank pin 445 and the other end of which is anchored to a bracket 435' suitably mounted on the truck frame.

Attention is now directed particularly to Figs. 1 and 6 and to the means for rotating the shaft 247 to effect application of the friction clutch 229 to effect rotation of the drive shaft 230. This means comprises a lever 448 keyed to the shaft 247 to cause rotation thereof. Through the lever 448 extends a threaded rod 449 provided with adjustable nuts 450 and a compression spring 451 held in place by an adjustable nut 452. The rod 449 is pivoted to an eccentric crank pin 453 the axis of which is spaced from the axis of the shaft 454 to which it is rigidly connected. The shaft 454 is journaled in a bearing box 455 carried by the plate 248. An operating handle 456 is keyed to the shaft 454.

In the positions of the parts illustrated in Figs. 1 and 2, the clutch 229 will be released. By the operator pulling the handle 456 toward him, shaft 454 will be rotated, and threaded rod 449 will be lifted by the crank action of the eccentric crank pin 453. Through the compression of spring 451, the lever 448 will rotate the shaft 247, thereby moving the collar 245 (Fig. 1) downwardly to compress the friction plates 238 through the ring 243 and the pins 242. The handle 456 is held in clutch applied position by virtue of the fact that it strikes a stop (not shown), slightly after the crank pin 453 passes over its dead center position. It is therefore evident that the clutch 229 will remain in clutch applied position when operating in this position, until it is disengaged by operation of the handle 456.

With the electric operating motor continuously operating in the same direction, the loading machine may be reciprocated to more efficiently effect loading of the coal, by operating the reversing clutches 259 and 260 of Fig. 1. In other words, with the electric operating motor continuously operating in the same direction, the operator may move the lever 441 in either direction from neutral position to effect operation of the reversing clutches 259 and 260 to effect reciprocations of the loading machine during loading operations. During such reciprocations of the loading machine the arrangement may be such as to effect slow movement of the truck propelling mechanism.

Since the gears 227, 240 and 236 rotate together with the shaft 230 when the clutch 229 is applied, the gear 236 will be rotated clockwise as viewed in plan in Fig. 1. The sprocket 297 is located on the left-hand side of the loading machine looking forward, and consequently when the gear 236 rotates clockwise, as viewed in plan, the right-hand gear 258 of Fig. 1 will effect clockwise rotation of the shaft 262, as viewed from the left of Fig. 1. This is the proper rotation for causing the sprocket chain 302 to drive the discharge conveyor in the proper direction for discharging the coal into mine cars. During normal operation of the loading machine the operator has no occasion for reversing the operating motor, but if the loading machine becomes stalled, it sometimes is desirable to reverse the electric operating motor in order to loosen the machine from the coal mass. Such reversal of the electric operating motor, however, does not interfere with the operator's manipulation of the reversing clutches 259, 260 of Fig. 1 to effect rearward movement of the loading machine along a mine track in order to assist in releasing the machine from the coal mass. During loading operations, the electric operating motor should always be driven in such direction as to effect proper direction of travel of the gathering conveyor and the discharge conveyor, the reversing clutches 259 and 260 of Fig. 1 being then relied upon to effect reversal of travel of the whole loading machine along the mine track.

The truck propelling mechanism comprises power transmission mechanism between the electric operating motor and all of the wheels of the truck. This power transmission mechanism is primarily under the control of the friction clutches 259, 260 shown in Fig. 1. The operator may apply or release the clutch 229 by means of the lever 456 as shown in Fig. 2. The truck propelling power transmission mechanism also includes the reversing clutches 259 and 260 shown in Fig. 1, either of which may be applied by the operator actuating the lever 441 in one direction or the other, as shown in Figs. 1 and 6, and consequently the loading machine during operation may be moved along the mine track in either direction without reversing the electric operating motor but even if the electric operating motor is reversed for the purpose above explained, the loading machine may be moved in either direction along the mine track at any time by means of the reversing clutches 259 and 260 of Fig. 1.

When the shaft 262 of Fig. 1 is rotated in one direction or the other, the pinion 272 thereon drives the discharge conveyor. The electric operating motor may be continuously operated in the same direction, while by means of the clutches 259 and 260 of Fig. 1 the loading machine may be moved forwardly or rearwardly under the control of the operator.

It should be particularly noted by reference to Fig. 1 that notwithstanding the association of the clutch 259 with the bevel gear 258 and the shaft 262, the sprocket 297 may always be rotated in the same direction when the operating motor is rotated in a given direction. In other words, the application or release of the clutch 259 at no time interferes with the rotation of the sprocket 297 from the operating motor.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a machine of the class described, the combination with a pivoted lever, of mechanism for rocking the same on its pivot, a second pivoted lever, adjustable abutment screws one on each of said levers and each adapted to be engaged by one of said levers, a driven shaft, mechanism comprising two friction clutches for driving said shaft in reverse directions, and mechanism connected between said second lever and said clutches to apply the same to effect such driving of said shaft in reverse directions, the application of one clutch effecting driving of said shaft in one direction and the application of the other clutch effecting driving of said shaft in the opposite direction, the construction and arrangement being such that the adjustment of said abutment screws predetermines the extent of application of said clutches.

2. In a machine of the class described, the combination with a driving shaft, of a driven shaft, means comprising two friction clutches for connecting said shafts for operation of said driven shaft in reverse directions, an operating lever, an actuating lever, clutch operating mechanism connected between said actuating lever and said clutches, and adjustable positive means between said levers for positively varying the throw of the clutches with a predetermined movement of said operating lever, in accordance with the wear of the clutches, said means comprising two adjustable abutments one mounted on one of said levers and the other mounted on the other lever.

3. In a machine of the class described, the combination with a driving shaft, of a driven shaft, means comprising a friction clutch connecting said shafts, mechanism for operating said clutch, an actuating lever connected to said operating mechanism, an operating lever, and positive means comprising abutment mechanism between said levers to positively vary the applying throw of the said actuating lever in accordance with wear of the clutch, said abutment mechanism being adjustable on one of said levers.

4. In a machine of the class described, the combination with a motor, of power transmission mechanism connected to said motor and comprising a clutch, mechanism for operating said clutch, an operating lever, an actuating lever connected to said clutch operating mechanism, and non-yielding transmitting connections between said levers comprising abutment mechanism to effect increased throw of the clutch operating mechanism in applying the same with a predetermined movement of said operating lever, said abutment mechanism being adjustably mounted on said levers.

5. In a machine of the class described, the combination with a driving shaft, of a driven shaft, reversing friction clutches associated with said driven shaft, mechanism comprising a rod in alinement with and movable along the center of the driven shaft axially thereof for applying said friction clutches, an operating lever, mechanism comprising dead-center means for limiting the movement of said lever to its opposite positions from neutral and locking said operating lever at its limiting positions, and connections comprising adjustable abutment mechanism for varying the extent of movement of said rod axially of said driven shaft in applying either of said friction clutches in controlling the reversal of rotation of said driven shaft.

6. In a machine of the class described, the combination with a driving shaft, of a driven shaft, a clutch adapted to connect said shafts, a pivoted operating device, a movable cam, means on said device in position to engage said cam to move the same when said device is moved on its pivot, said cam comprising mechanism limiting the movement of said engaging means to a position just beyond dead center relative to the pivot of said device to effect locking of the latter just beyond such dead center position, and clutch actuating mechanism between said cam and said clutch.

7. In a machine of the class described, the combination with a motor, of a driving shaft connected thereto, a driven shaft, power transmission mechanism between said shafts comprising a clutch, a pivoted operating device, a movable cam, means on said device for engaging said cam to move the same in opposite directions, said cam comprising mechanism limiting the movement of said engaging means to opposite positions beyond dead centers relative to the pivot of said device to effect locking of the latter adjacent such dead center positions, and clutch actuating mechanism between said cam and said clutch.

8. In a machine of the class described, the combination with a motor, of a driving shaft connected thereto, a driven shaft, power transmission mechanism between said shafts and comprising a clutch, a pivoted actuating lever connected to said clutch, an operating lever, a cam device associated with said operating lever and having a cam slot, and connections between said operating lever and said cam device comprising a pin extending into said slot in position for movement toward that end of said slot nearer the pivot of the actuating lever to effect locking of the operating lever in clutch applied position by reason of said pin being moved beyond a dead center position.

9. In a machine of the class described, the combination with a driving shaft, of a driven shaft, power transmission mechanism between said shafts comprising a friction clutch, means comprising a pivoted operating lever for applying said clutch, an actuating lever, means comprising a crank pin engaging a cam mounted on said operating lever, and lost-motion take-up mechanism between said levers to limit movement of the crank pin to slightly beyond dead center to hold the clutch applied, said take-up mechanism being adjustable to compensate for wear of the clutch and to permit increased throw of the actuating lever to apply the clutch while the throw of the operating lever remains substantially the same to maintain its dead center position to hold the clutch applied.

10. In a machine of the class described, the combination with a drive shaft, of a driven shaft, power transmission mechanism between said shafts comprising a clutch, means comprising two pivoted levers having lost motion between them, mechanism connecting one of said levers to said clutch, mechanism supporting said levers for one to have a variable throw and the other to have always the same predetermined throw, and mechanism for adjusting the amount of lost motion between said levers to effect variation in the throw of that lever connected to the clutch.

11. In a machine of the class described, the combination with a drive shaft, of a hollow driven shaft having elongated slots therethrough, power transmission means between said shafts to drive the driven shaft in reverse directions, said power transmission means comprising a pair of friction clutches mounted on the hollow driven shaft, a clutch operating shaft having elongated slots therethrough and extending through said hollow driven shaft and rotatable therewith, clutch operating keys extending through said elongated slots in said driven shaft and in said operating shaft, and means for actuating said operating shaft by sliding the same longitudinally of said hollow shaft to effect alternate application of said clutches for reversing the rotation of said driven shaft.

12. In a machine of the class described, the combination with a drive shaft, of a driven shaft, power transmission means between said shafts and comprising a friction clutch, a shaft shiftable axially and connected to said clutch to operate the same, lost motion operating mechanism for said axially shiftable shaft comprising a pivoted lever connected to the last-named shaft and a pivoted yoke having arms on opposite sides of said lever with the latter pivotally mounted for predetermined limits of movement, the lost motion being between said lever and the arms of said yoke mechanism for adjusting the lost motion in accordance with the wear in the friction clutch, the lost motion being decreased as the wear increases, and means for swinging the yoke about its pivot, the throw of the swinging means being maintained approximately the same by operating said adjusting mechanism to compensate for the wear in the clutches.

13. In a machine of the class described, the combination with a drive shaft, of a driven shaft, power transmission means between said shafts comprising reversely operable friction clutches, a shaft shiftable axially in reverse directions to operate said clutches selectively, lost motion operating means for said shiftable shaft comprising a pivoted lever and a pivoted yoke with the lever connected to said shiftable shaft to have no lost motion relatively thereto but having an extension with lost motion connection between the same and spaced arms of said pivoted yoke, mechanism for adjusting the lost motion between said extension and said yoke in accordance with the wear in said friction clutches, the lost motion being decreased as the wear increases, and means for swinging the yoke about its pivot, the throw of said swinging means being maintained approximately the same by operating said adjusting mechanism to compensate for the wear in the clutches.

14. In a machine of the class described, the combination with a driving shaft, of a driven shaft, power transmission mechanism between said shafts comprising a friction clutch associated with said driven shaft, means comprising a series of three pivoted levers for operating said clutch, the first and second levers having no lost motion between them but the second and third levers having lost motion between them, the third lever being connected to the friction clutch, the first lever being swingable in a plane extending at right angles to said driven shaft, and mechanism affording adjustment of the lost motion between the second and third levers, the construction and arrangement being such that swinging of the first lever in a plane at right angles to said driven shaft imparts swinging movement to the second lever which in turn after lost motion imparts swinging movement to the third lever and the latter effects the operation of said friction clutch.

15. In a machine of the class described, the combination with a driving shaft, of a driven shaft, means comprising two friction clutches for connecting said shafts for operation of said driven shaft in reverse directions, means comprising a series of three pivoted levers for operating said clutches to effect rotation of said driven shaft in reverse directions, the first lever being mounted for swinging movement in a plane at right angles to the said driven shaft, the first and second levers having no lost motion between them but the second and third levers having lost motion between them, the third lever being connected to the said friction clutches for operation thereof, and mechanism affording adjustment of the lost motion between the second and third levers, the construction and arrangement being such that swinging of the first lever in a plane at right angles to said driven shaft imparts swinging movement to the second lever which in turn after lost motion imparts swinging movement to the third lever and the latter effects operation of either of said friction clutches.

16. In a machine of the class described, the combination with a drive shaft, of a driven shaft, power-transmission mechanism comprising a friction clutch connecting said shafts, a clutch applying ring surrounding said driven shaft and having direct annular contact with the clutch, a rod slidable along the center of said driven shaft axially thereof, an elongated slot extending diametrically through said driven shaft, a key extending radially from said rod through said slot into position to engage said clutch applying ring at opposite sides of said driven shaft, and mechanism for sliding said rod to cause said radially projecting key to exert pressure on said clutch applying ring in directions parallel to the axis of rotation of said driven shaft to thereby effect the application of said friction clutch.

17. In a machine of the class described, the combination with a drive shaft, of a driven shaft, reversing power-transmission mechanism comprising a pair of friction clutches connecting said shafts and each comprising an enclosing casing, a rod concentric with said friction clutches, two clutch applying rings one associated with one of said friction clutches within its casing and the other associated with the other friction clutch within its casing, keys mounted on said rod in spaced-apart relation and having radial extensions from slots in said driven shaft, and means for moving said rod axially to cause said radial extensions to exert pressure on either ring at opposite sides of said driven shaft to thereby effect application of either one of said friction clutches while the other is released.

18. In a machine of the class described, the combination with a driving shaft, of a driven shaft, power transmission mechanism comprising a friction clutch between said shafts and mounted concentrically of the driven shaft, an actuating rod slidable in said driven shaft axially thereof, a clutch applying ring surrounding said driven shaft and in engagement with the clutch over a complete circle, a key mounted on said actuating rod and having radial extensions through slots in said driven shaft into positions for engaging said clutch applying ring, and means for sliding said rod axially of said driven shaft to cause said extensions to exert pressure on said clutch applying ring and thereby effect the application of said friction clutch.

19. In a machine of the class described, the combination with a drive shaft, of a driven shaft, power transmission mechanism between said shafts comprising a friction clutch associated with said driven shaft, means comprising a variable throw pivoted lever for applying said clutch, another pivoted lever for actuating said variable throw lever, mechanism mounting said pivoted levers with lost-motion between them, and mechanism affording adjustment of the said lost motion, the construction and arrangement being such that the swinging throw of the second-named pivoted lever shall always be the same while the swinging throw of the first-named pivoted lever may be variable for variation of the extent of application of the clutch.

20. In a machine of the class described, the combination with a drive shaft, of a driven shaft, power transmission mechanism between said shafts comprising a friction clutch associated with said driven shaft, an actuating pivoted lever connected to said clutch, an operating pivoted lever, mechanism mounting said pivoted levers with lost motion between them and with a fixed throw of the operating pivoted lever, and mechanism affording adjustment of said lost motion between the pivoted levers to secure a variable swinging throw of the actuating lever in accordance with a variable extent of application of said clutch, the construction and arrangement being such that the swinging throw of the operating lever shall always remain the same while the swinging throw of the actuating lever may be variable for variation of the extent of application of the clutch.

21. In a machine of the class described, the combination with a driving shaft, of a driven shaft, power transmission mechanism between said shafts comprising a friction clutch associated with said driven shaft, means comprising a series of three pivoted levers for operating said clutch with gearing between the first and second levers and no lost motion and with lost motion between the second and third levers, a connection between the third lever and the friction clutch, the bevel gearing enabling the first lever to be movable in a plane extending parallel to the axis of pivotal movements of the second and third levers such axis being transverse of the axis of the driven shaft, and mechanism affording adjustment of the lost motion between the second and third levers, the construction and arrangement being such that swinging actuation of the first lever in a plane at right angles to the driven shaft imparts movement through said gearing to the second lever which in turn after lost motion imparts swinging movement to the third lever and the latter effects the operation of the friction clutch.

22. In a machine of the class described, the combination with a driving shaft, of a driven shaft, means comprising a pair of friction clutches for connecting said shafts for operation of said driven shaft in reverse directions, means comprising a series of three pivoted levers for operating said clutches to effect rotation of said driven shaft in reverse directions with lost motion between the second and third pivoted levers and with bevel gearing between the first and second levers, said bevel gearing enabling the first lever to be moved in a plane extending at right angles to said driven shaft, a connection between the third lever and said friction clutches, and mechanism affording adjustment of the lost motion between the second and third levers, the construction and arrangement being such that the swinging actuation of the first lever in a plane at right angles to said driven shaft imparts swinging movement to the second lever which in turn after lost motion imparts swinging movement to the third lever and the latter effects operation of either of said friction clutches.

23. In a machine of the class described, the combination with power-transmission mechanism comprising a friction clutch, of mechanism comprising an actuating lever for applying said clutch, an operating lever having a slot, means comprising a crank pin extending into said slot for swinging said operating lever, and means for adjustably taking up lost motion between said levers to enable said crank pin to be moved slightly more than ninety degrees from neutral position so as to obtain a dead center holding position for said crank pin and said operating lever, the construction and arrangement being such that the application of the clutch may be varied by varying the throw of the actuating lever while the throw of the operating lever always remains as predetermined to maintain the dead center holding position for the operating lever.

NILS D. LEVIN.